(12) United States Patent
Kobayashi et al.

(10) Patent No.: US 7,847,878 B2
(45) Date of Patent: Dec. 7, 2010

(54) ELECTRONIC APPARATUS

(75) Inventors: Hiroshi Kobayashi, Kawasaki (JP); Tetsuya Hori, Kawasaki (JP); Toshiyuki Itoh, Kawasaki (JP); Yoshiaki Katou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 12/183,130

(22) Filed: Jul. 31, 2008

(65) Prior Publication Data

US 2009/0079895 A1 Mar. 26, 2009

(30) Foreign Application Priority Data

Sep. 26, 2007 (JP) .............................. 2007-249323

(51) Int. Cl.
*G02F 1/1333* (2006.01)
(52) U.S. Cl. ...................................................... 349/58
(58) Field of Classification Search ................... 349/58
See application file for complete search history.

(56) References Cited

U.S. PATENT DOCUMENTS

| | | | | |
|---|---|---|---|---|
| 5,216,411 A * | 6/1993 | Ashitomi et al. ............ 345/168 |
| 5,835,139 A * | 11/1998 | Yun et al. ...................... 349/58 |
| 5,926,237 A * | 7/1999 | Yun et al. ...................... 349/58 |
| 6,392,723 B1 * | 5/2002 | Sugiyama et al. ............. 349/58 |
| 6,525,790 B1 * | 2/2003 | Kan-o .......................... 349/58 |
| 6,593,979 B1 * | 7/2003 | Ha et al. ....................... 349/58 |
| 7,659,949 B2 * | 2/2010 | Sawada et al. ................ 349/58 |
| 2006/0061704 A1 | 3/2006 | Hayano et al. |

FOREIGN PATENT DOCUMENTS

| | | |
|---|---|---|
| CN | 1607427 A | 4/2005 |
| JP | 05-206923 | 8/1993 |
| JP | 2001-175608 | 6/2001 |
| JP | 2002-027056 | 1/2002 |
| JP | 2006-084969 | 3/2006 |

OTHER PUBLICATIONS

Chinese Office Action for corresponding Chinese Patent Application No. 200810131168.0 dated Jun. 23, 2010.

* cited by examiner

*Primary Examiner*—James A Dudek
(74) *Attorney, Agent, or Firm*—Staas & Halsey LLP

(57) ABSTRACT

An electronic apparatus includes a frame made of metal, a holder that is made of metal and engaged with the frame, a display panel that is arranged between the frame and the holder, and configured to display information, and a housing that includes a front case and a rear case, and accommodates the frame, the holder and the display panel

7 Claims, 15 Drawing Sheets

(a)

(b)

ELECTRONIC APPARATUS

BACKGROUND OF THE INVENTION

1. Field of the Invention

The present invention relates to an electronic apparatus, and more particularly to a display of an electronic apparatus. The present invention is suitable, for example, for a mobile radio communication phone, a personal digital assistant, and a portable game machine.

2. Description of the Related Art

Recently, a display of a cellular phone has increasingly been required to have a wider screen and a lower profile as well as the dust resistance and strength. FIGS. 16A and 16B are schematically partially sectional views of conventional, two types of displays 1 and 1A. In FIGS. 16A and 16B, 10 and 10A denote front cases made of resin. 12 denotes a liquid crystal display ("LCD") panel, 14 a double-sided tape, 16 a packing, 17 a LCD module, and 18 a holder.

The front cases 10 and 10A are screwed with rear cases (not shown). The LCD panel 12 displays information. The packing 16 has a dustproof function. The LCD module 17 holds the LCD panel 12. The holder 18 is a resin or metal sheet member that is attached to the rear case, and configured to hold the LCD module 17.

Prior art includes Japanese Patent Laid-Open No. ("JP") 05-206923, JP 2006-84969, JP 2002-27056, and JP 2001-175608.

The display 1A in which a holder 11A of the front case 10 does not project over the packing 16 provides a lower profile than the display 1 in which a holder 11 of the front case 10 projects over the packing 16. However, both the displays 1 and 1A require the front cases 10 and 10A to possess accommodation heights H and HA used to accommodate the LCD panel 12, and thus are unsuitable for a lower profile configuration. In addition, both displays 1 and 1A draw the LCD panels 12 from the surfaces on the side of the LCD modules 17 through the double-sided tapes 14. Thus, the LCD panel 12 is likely to float on external impact, and the strength or impact resistance is weak. Moreover, the LCD panel 12 of the display 1A is likely to float due to the reaction of the packing 16 when the temperature of the LCD panel 12 changes (for example, at the temperature cycling test time), and thus the display 1A has low strength and bad dust resistance. The problem of the strength and dust resistance becomes conspicuous as the LCD panel 12 becomes larger.

SUMMARY OF THE INVENTION

The present invention is directed to an electronic apparatus that can reconcile both the low profile and the strength.

An electronic apparatus according to one aspect of the present invention includes a frame made of metal, a holder that is made of metal and engaged with the frame, a display panel that is arranged between the frame and the holder, and configured to display information, and a housing that includes a front case and a rear case, and accommodates the frame, the holder and the display panel. According to this electronic apparatus, the metal frame and holder are engaged with each other and hold the display panel between them, preventing floating of the display panel. For example, even when a dustproof member, such as a packing, is provided under the display panel, the display panel does not float due to the reaction of the dustproof member. The metal frame and holder are stronger than resin, and can be made thinner than the minimum thickness formable through resin molding, providing a low profile. In addition, the front case does not need the accommodation height H or HA, providing a low profile.

The front case or rear case may include an engagement part that is configured to contact part of the frame, and to restrict a movement of the frame in a direction in which the frame detaches from the front case. This configuration can prevent a detachment of the front case from the rear case on external impact, and improve the impact resistance.

The frame may be located between the front case and the display panel, and part of the front case, part of the display panel, and part of the frame constitute the same plane. An arrangement of the same plane prevents a projection of one of these members, a contact of that member with an external member, and a resultant damage, in addition to providing a low profile.

The frame may expose a center part of the display panel and covers a periphery of the display panel, and the display panel is depressed at the periphery. Thereby, the part of the panel, and the part of the frame can constitute the same plane, preventing a projection of the frame and a contact of the frame with an external member, in addition to providing a low profile.

The electronic apparatus may further include a module arranged between the display panel and the holder, engaged with the holder, and configured to hold the display panel, and a dustproof member arranged between the display panel and the module. This configuration can improve the dust resistance of the electronic apparatus. Even when the dustproof member is arranged between the display panel and the module, it is located between the metal frame and the holder. Therefore, the display panel is prevented from floating due to the reaction of the dustproof member.

The front case may have a perforation hole, and the electronic apparatus may further include a fixture member configured to fix the front case onto the rear case via a perforation hole in the front case. This configuration can prevent a detachment of the unit from the front case on external impact, and improves the impact resistance.

The electronic apparatus may further include a receiver, wherein the frame includes an attachment part to which the receiver is attached. The multifunctional frame that has a function to attach the receiver can provide a further miniaturization.

Further features of the present invention will become apparent from the following description of exemplary embodiments (with reference to the attached drawings).

BRIEF DESCRIPTION OF THE DRAWINGS

FIG. 11 (lower right) is a partially enlarged perspective view of an LCD unit circled in FIG. 11 (left). FIG. 11 (upper right) is a partially enlarged perspective view of a rear case circled in FIG. 11 (left).

FIG. 15 (right) is an enlarged perspective view of an LCD frame metal sheet of the LCD unit shown in FIG. 15 (left).

DESCRIPTION OF THE EMBODIMENTS

Referring now to the accompanying drawings, a description will be given of a cellular phone 100 as one example of an electronic apparatus according to the present invention. The cellular phone is one example of a mobile radio communication apparatus, which generalizes a cellular phone, a personal digital cellular ("PDC"), a personal handy phone ("PHS"), and another mobile communication terminal in this embodiment.

Figure 1:
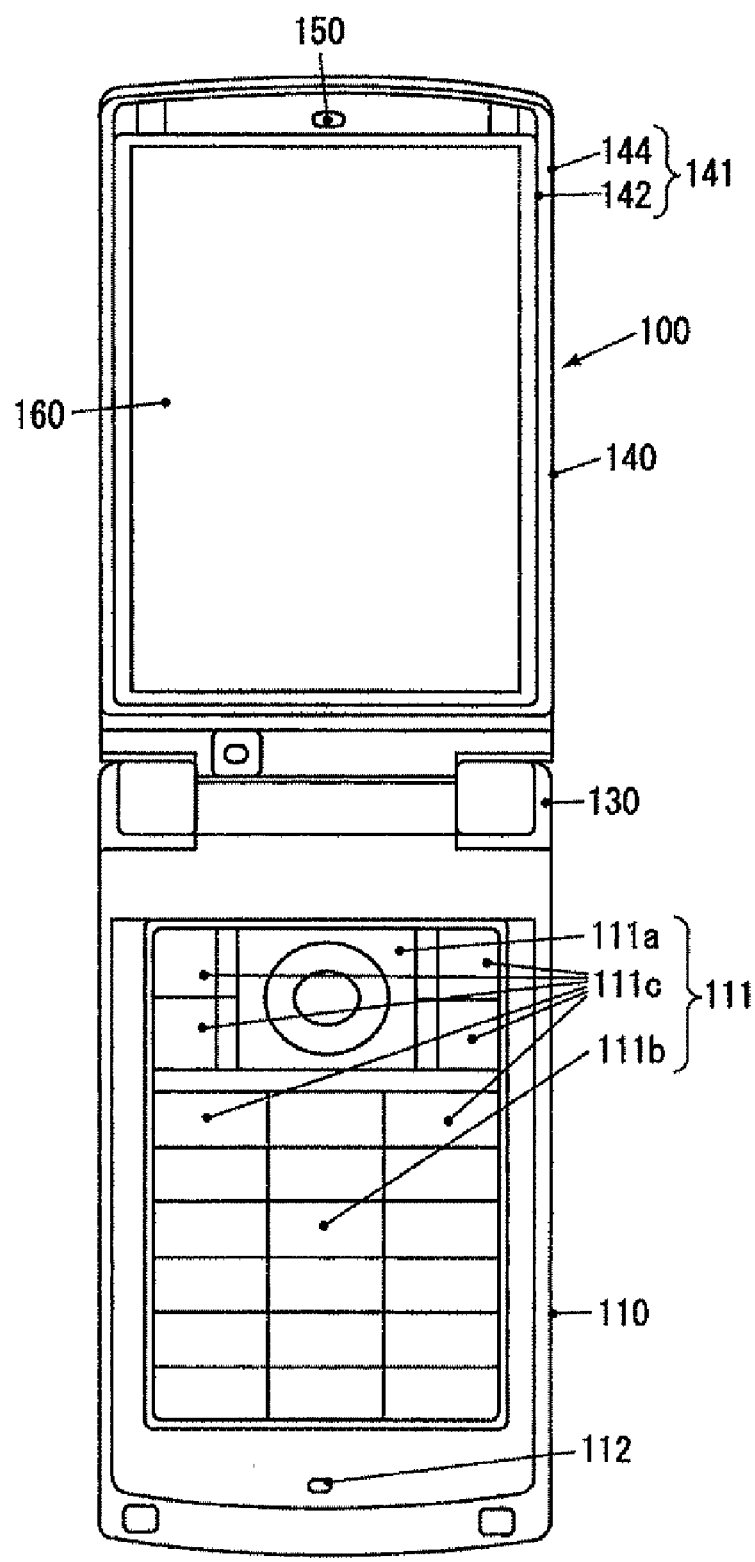
FIG. 1 is a front view of an unfolded cellular phone according to one embodiment of the present invention.
Figure 2:
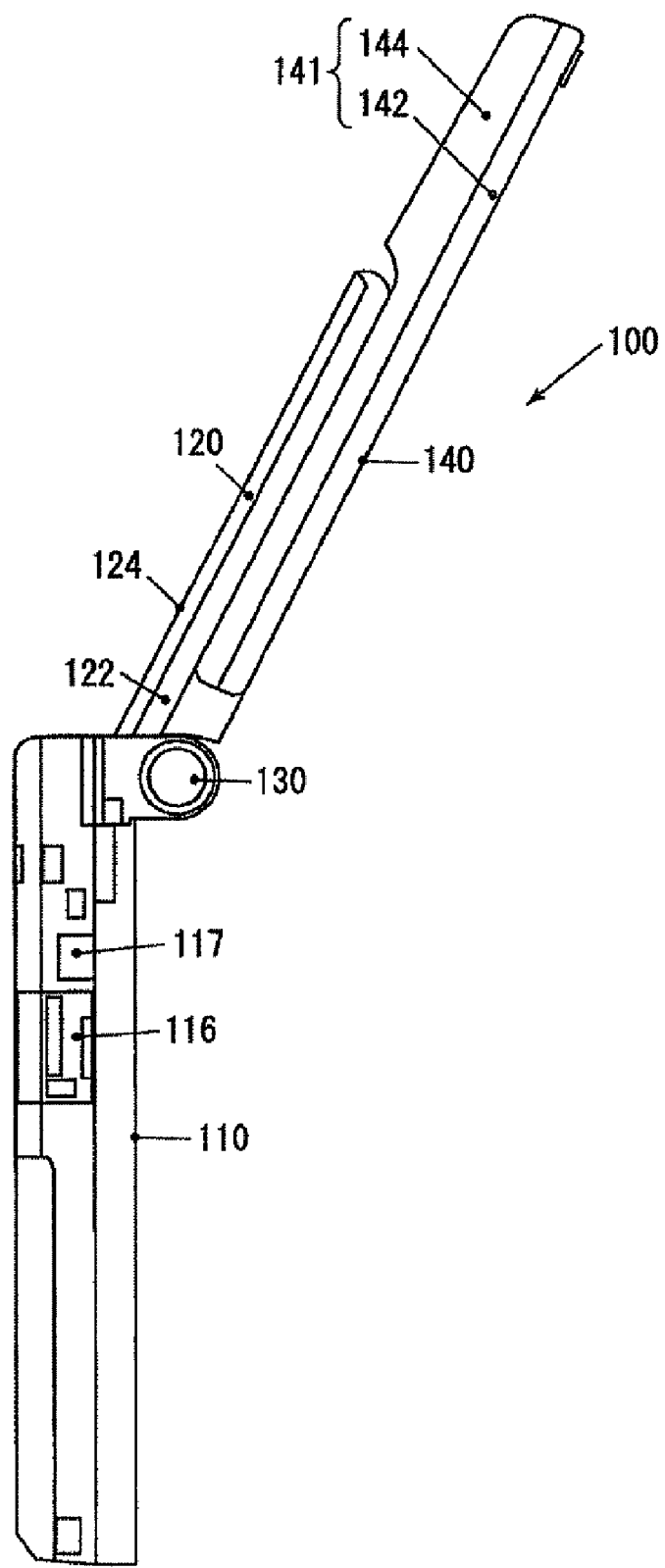
FIG. 2 is a left side view of the cellular phone shown in FIG. 1.
Figure 3:
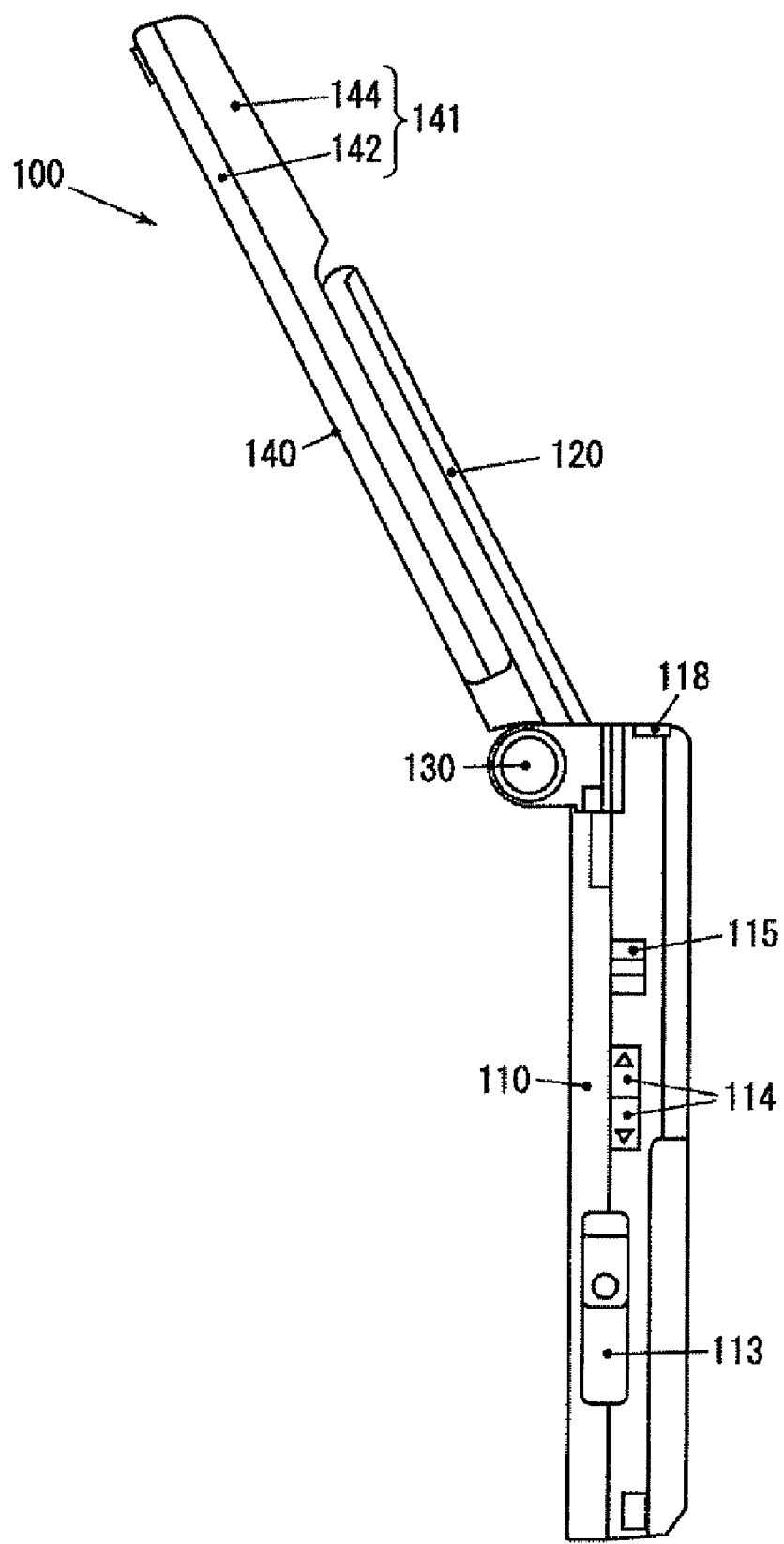
FIG. 3 is a right side view of the cellular phone shown in FIG. 1.
Figure 4:
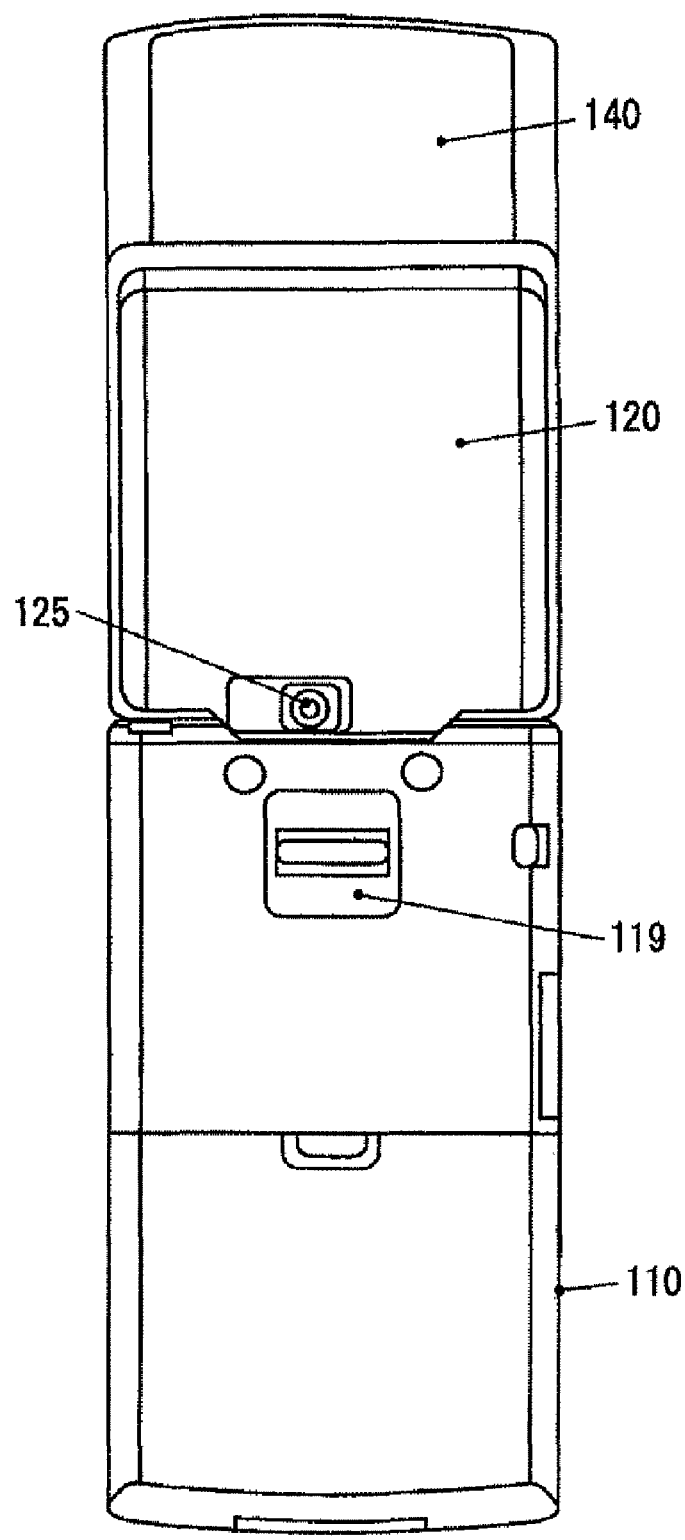
FIG. 4 is a rear view of the cellular phone shown in FIG. 1.
Figure 5:
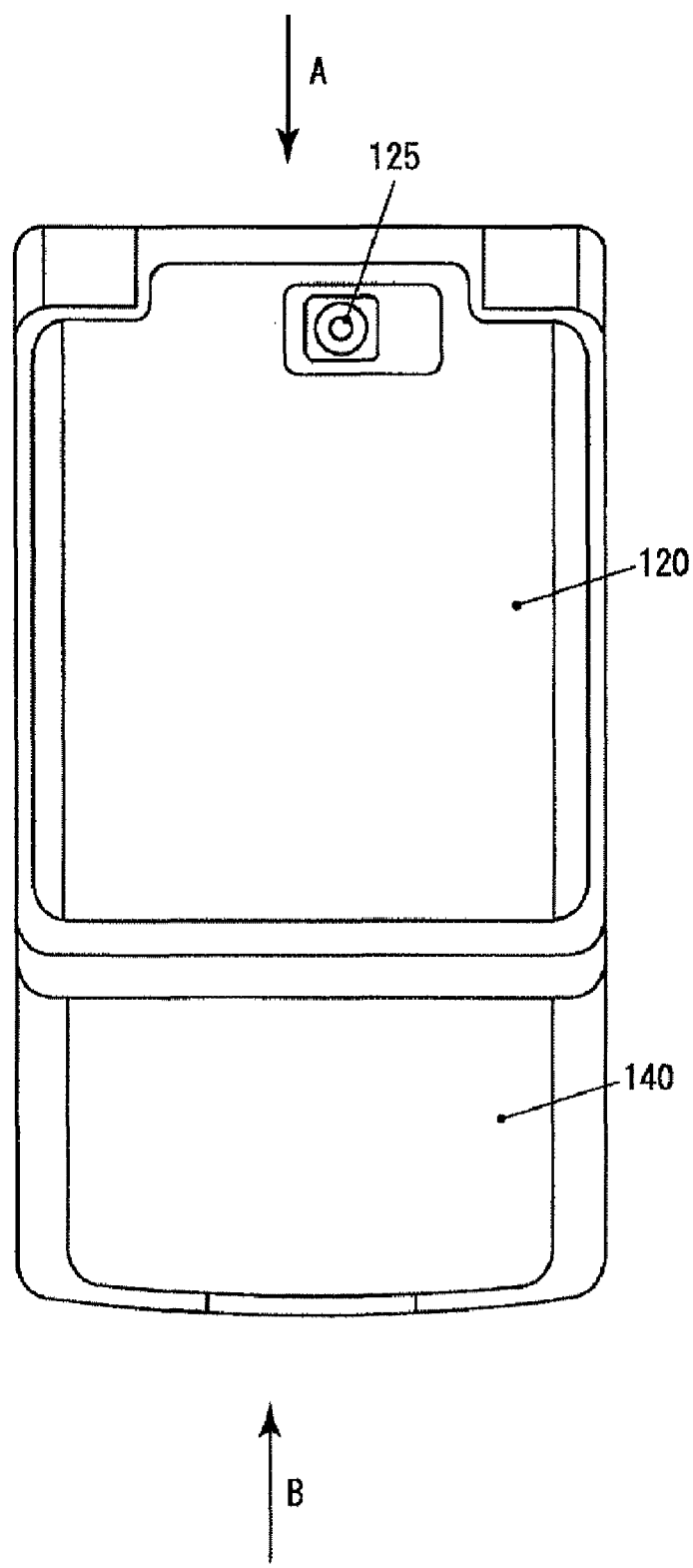
FIG. 5 is a plane view of a folded state of the cellular phone shown in FIG. 4.
Figure 6:
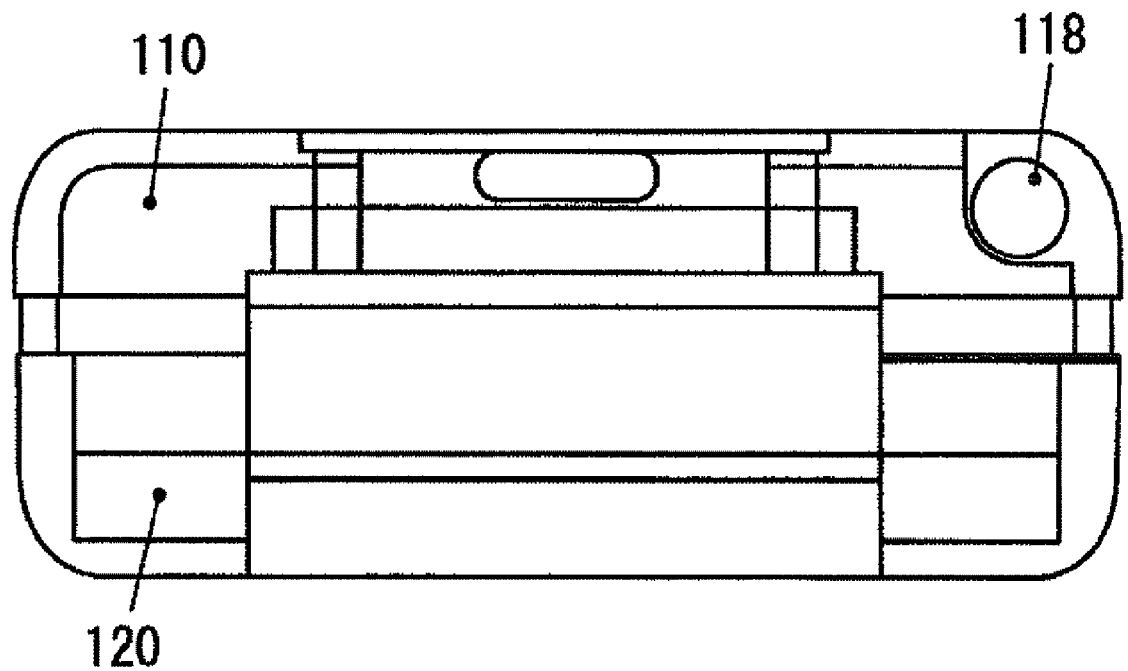
FIG. 6 is a side view of the cellular phone viewed from A side in FIG. 5.
Figure 7:
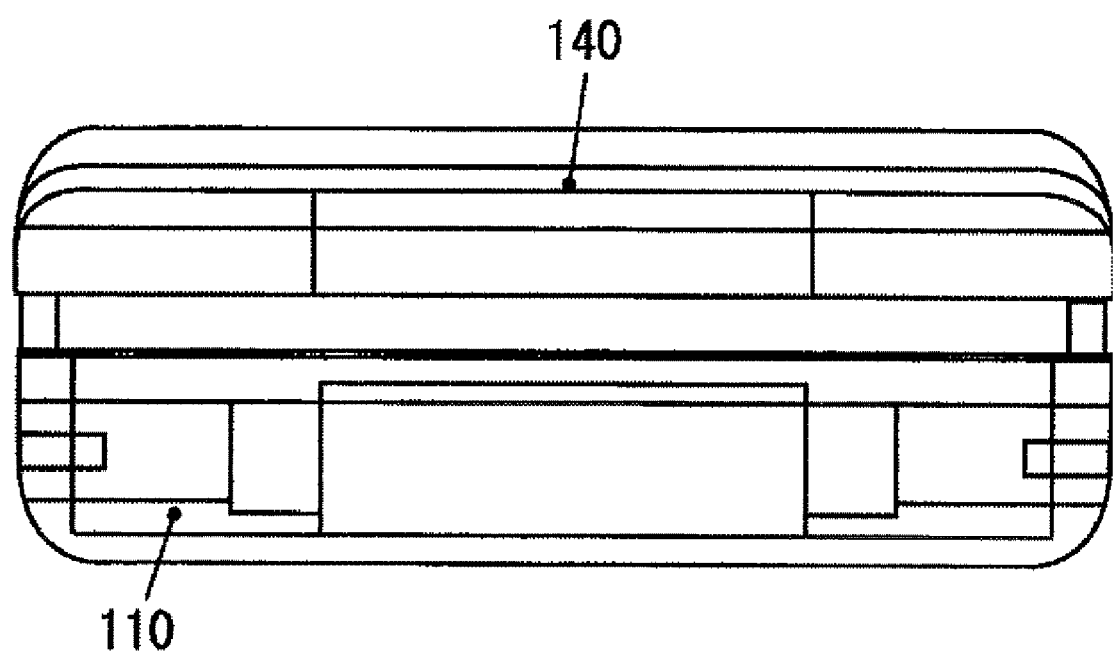
FIG. 7 is a side view of the cellular phone viewed from B side in FIG. 5.
Figure 8:
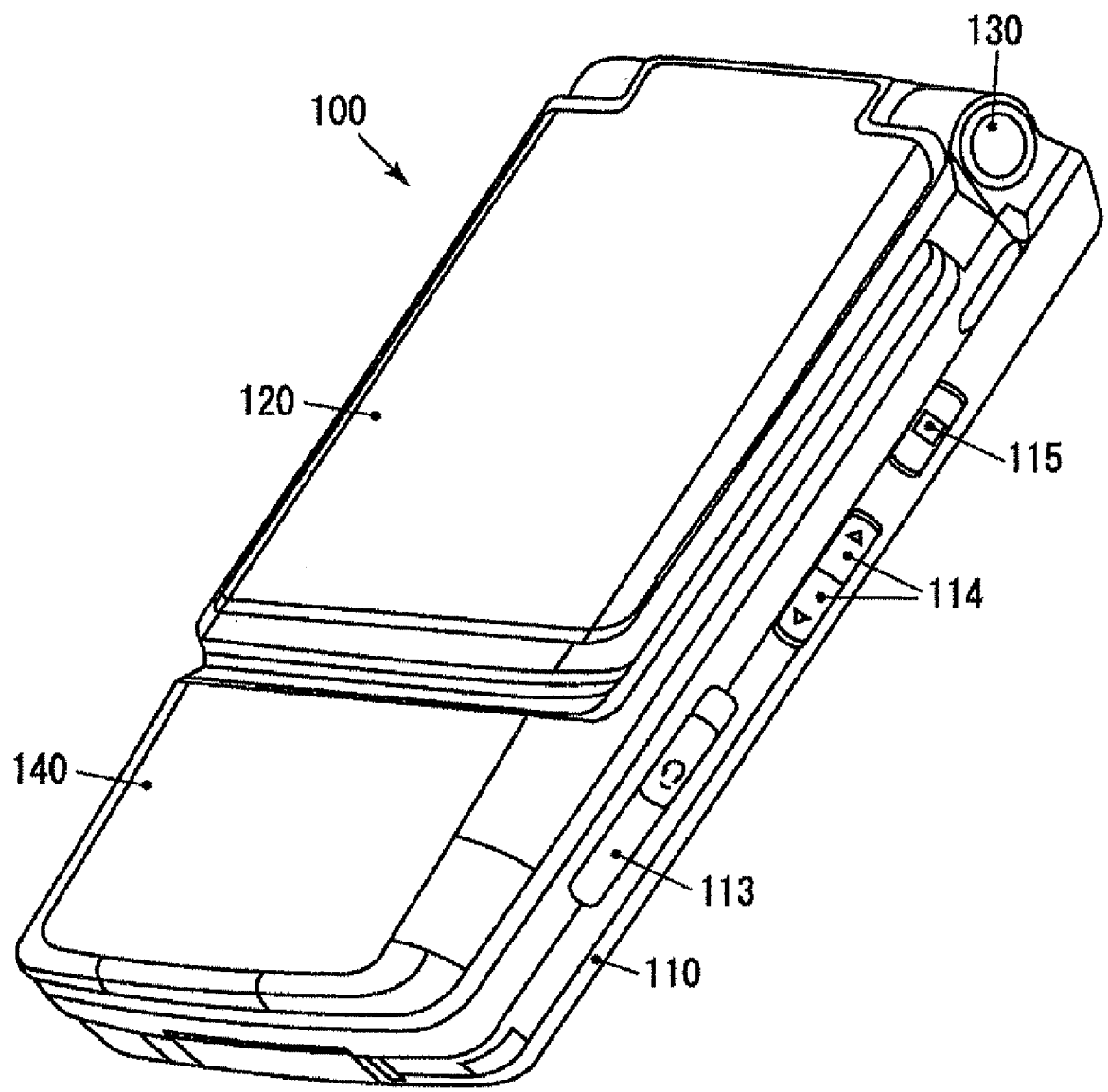
FIG. 8 is a perspective view of a cellular phone shown in FIG. 5.
Figure 9:
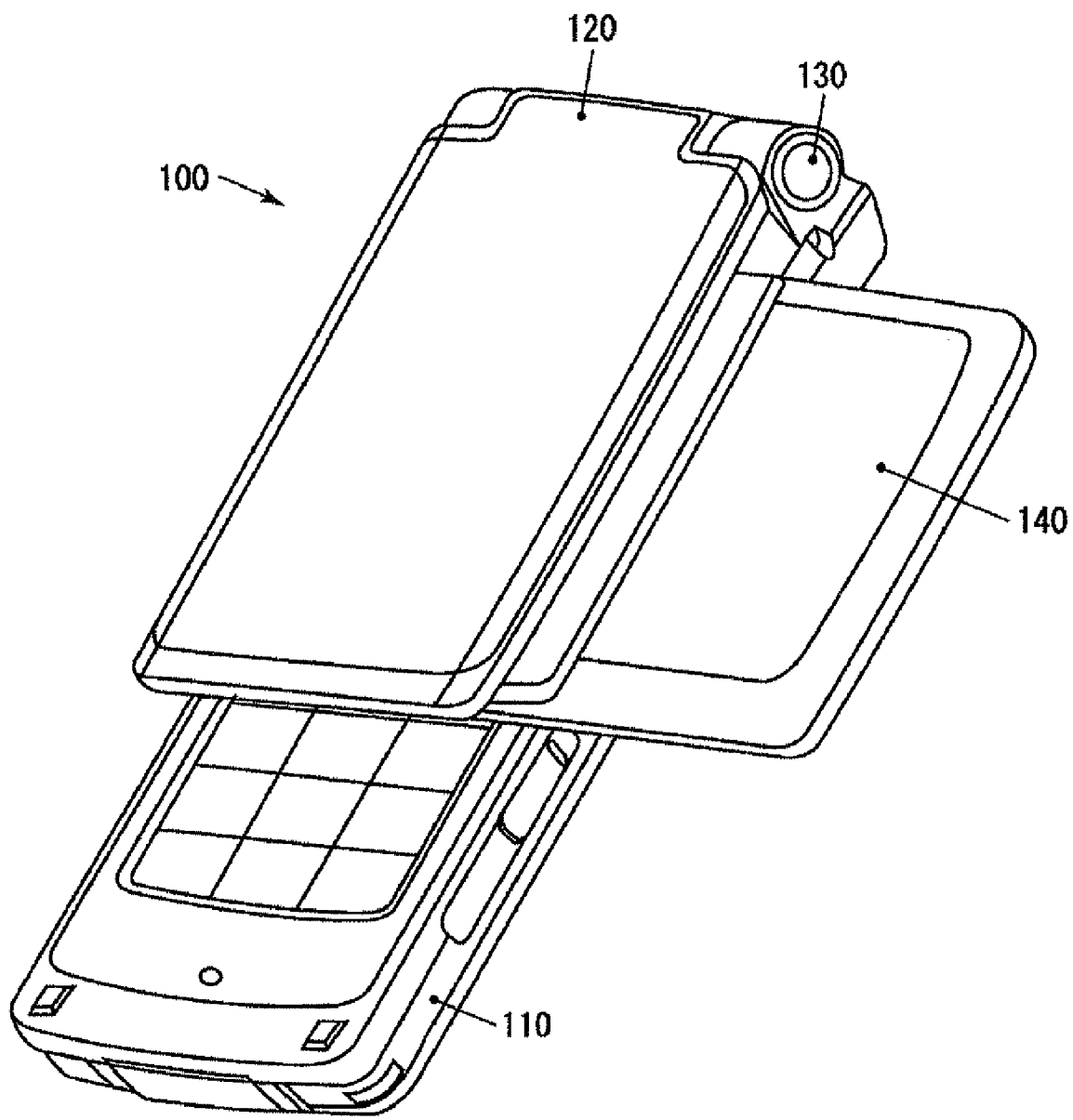
FIG. 9 is a perspective view of the cellular phone shown in FIG. 8 in which the movable part is rotated.

FIG. 1 is a front view of an unfolded state of the cellular phone 100. FIG. 2 is a left side view of the cellular phone 100 shown in FIG. 1. FIG. 3 is a right side view of the cellular phone 100 shown in FIG. 1. FIG. 4 is a rear view of the cellular phone 100 shown in FIG. 1. FIG. 5 is a plane view showing a folded state of the cellular phone. FIG. 6 is a side view of the cellular phone 100 viewed from the A side in FIG. 5. FIG. 7 is a side view of the cellular phone 100 viewed from the B side in FIG. 5. FIG. 8 is a perspective view of the cellular phone 100 shown in FIG. 5. FIG. 9 is a perspective view of the cellular phone 100 shown in FIG. 8 in which the movable part 140 is rotated.

The cellular phone 100 is a foldable cellular phone in which the arm 120 is combined with the fixing part 110 so that the arm 120 can be folded over the fixing part 110 via the hinge part 130. The arm 120 is configured to rotate relative to the fixing part 110. A user can fold the arm 120 over the fixing part 110 as shown in FIG. 5 when he does not use the cellular phone 100, and a user can unfold the arm 120 from the fixing part 110 by rotating the folded arm 140 before he uses the cellular phone 100, as shown in FIGS. 1 to 4.

The fixing part 110 has a housing structure that combines a front case with a rear case, and both cases are made, for example, of ABS resin through injection molding and combined with each other by screws. The fixing part 110 includes an input part 111 that includes multiple keys 111a, ten-key 111b, and various buttons 111c, through which the user inputs communication information, a microphone 112, a slide type earphone cap 113, a battery (not shown), a printed board (not shown), volume buttons 114, a music key 115, a micro SD slot 116, a push talk key 117, an antenna 118, and a fingerprint authenticator 119. Since these members are known as in F904i sold by this assignee, a further illustration and a detailed description will be omitted.

The arm 120 has a case 122 arranged at a lower side, and a cover member 124 that covers the case 122. An electronic component (not shown) is accommodated between the case 122 and the cover member 124. The electronic component includes a printed board, a cable, a camera 125, and another electronic component. The printed board is connected to the display of the movable part 140 and the receiver 150 via the cable. The printed board processes information displayed on the LCD unit and information output from the receiver 150, and communicates with a printed board of the fixing part 110 via a flexible printed board ("FPC") (not shown). The case 122 is made, for example, of ABS resin through injection molding. The cover member 124 has a three-layer structure that consists of an aluminum panel, a double-sided tape, and a resin case, and the resin case is screwed with or fixed onto the case 122.

The hinge part 130 connects the arm 120 to the fixing part 110 so that the arm 120 can be folded over and unfolded from the fixing part 110.

The movable part 140 is configured to rotate relative to the arm 120, as shown in FIGS. 8 and 9. Since the rotation mechanism for the movable part 120 is known as in F904i sold by this assignee, an illustration and a detailed description thereof will be omitted.

Figure 10:
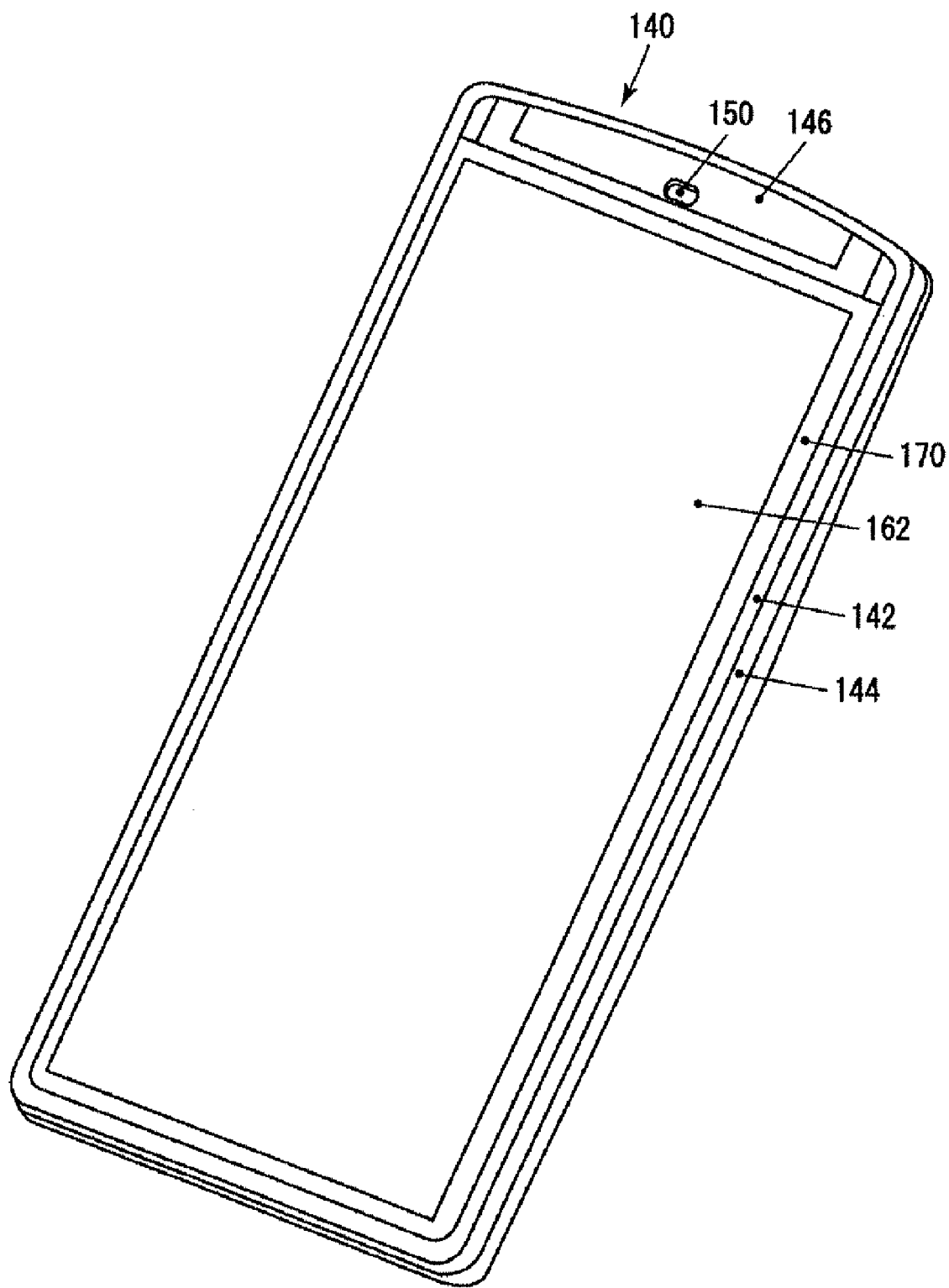
FIG. 10 is a perspective view of the movable part.
Figure 11:
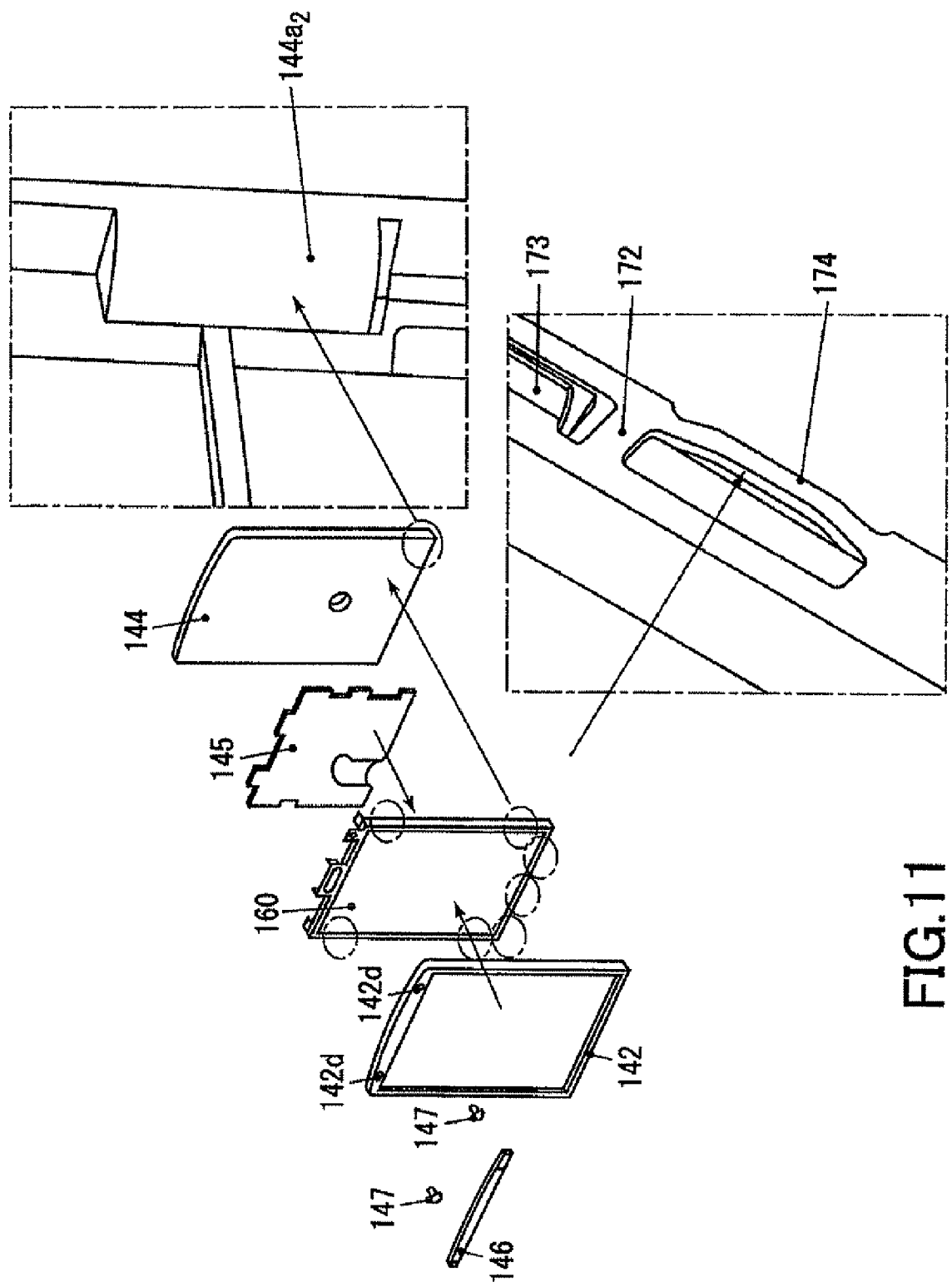
FIG. 11 (left) is an exploded perspective view of the movable part.

FIG. 10 is a perspective view of the movable part 140. FIG. 11 (left) is an exploded perspective view of the movable part 140. The movable part 140 has a housing 141 that combines a front case 142 with a rear case 144, and both cases are made, for example, of ABS resin through injection molding. Both cases are combined with each other by screws 147.

The movable part 140 includes a receiver 150 and an LCD unit 160. The receiver 150 outputs a voice of a communicate, and a sound, such as music and alarm. As shown in FIG. 11 (left), the movable part 150 accommodates the LCD unit 160 in the housing 141. More specifically, a board 145, the LCD unit 160, the front case 142, and the case pad 146 are attached onto the rear case 144. FIG. 11 (lower right) is a partially enlarged perspective view of an LCD unit 160 circled in FIG. 11 (left). FIG. 11 (upper right) is a partially enlarged perspective view of the rear case 144 circled in FIG. 11 (left).

Figure 12:
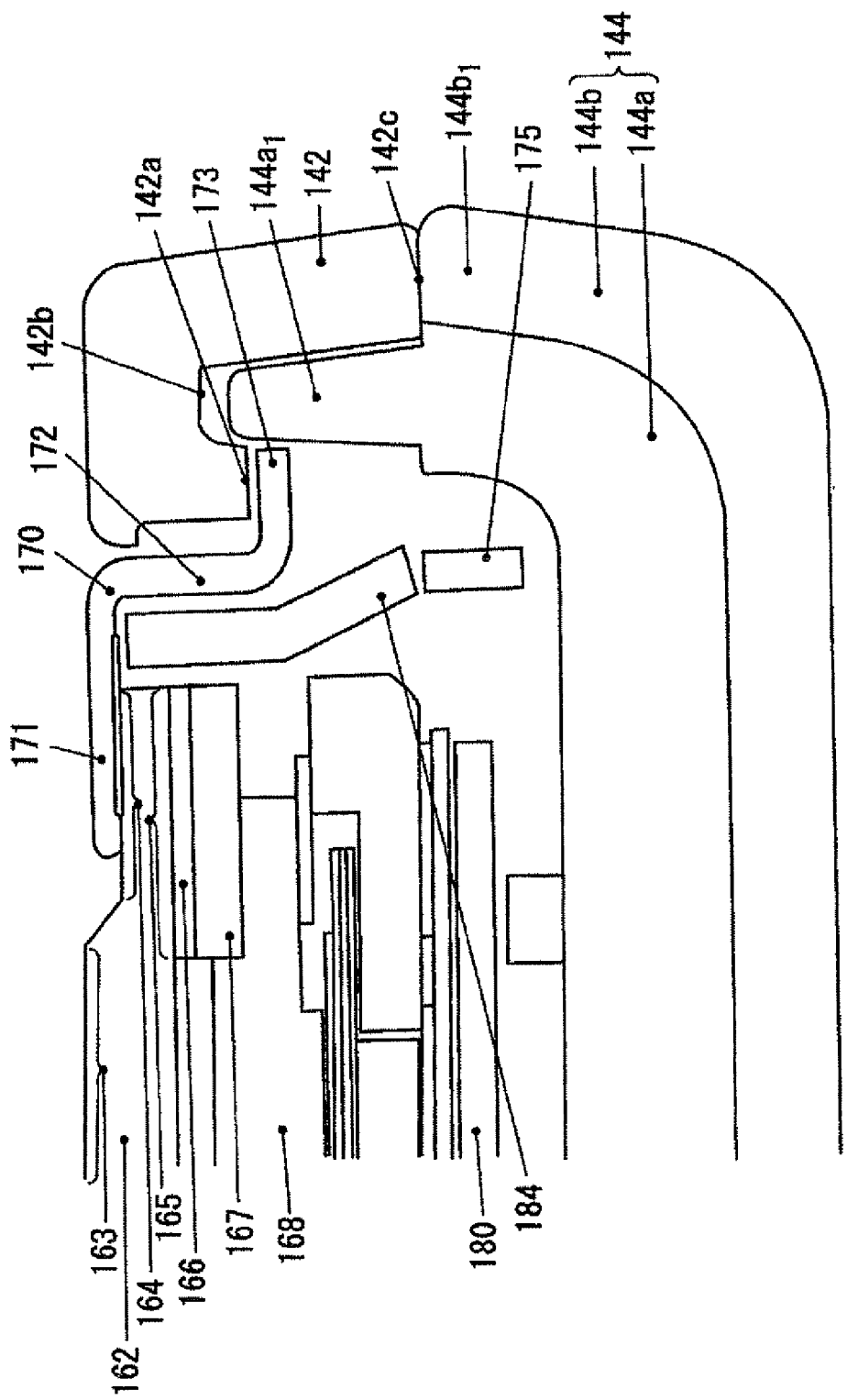
FIG. 12 is a partially enlarged sectional view of the movable part shown in FIG. 10.

The front case 142 includes an engagement part 142a, an engagement groove 142b, an end 142c, and a pair of perforation holes 142d. The front case 142 of this embodiment is different from the conventional front cases 10 and 10A in that the front case 142 does not hold the LCD panel 162 and does not have to secure the accommodation height H or HA, thereby realizing a low profile. The engagement part 142a is an end that can contact part (which is an engagement part 173) of an LCD frame metal sheet 170 of the LCD unit 160, as described later with reference to FIG. 12. Thereby, the engagement part 142a restricts a movement of the LCD frame metal sheet 170 in a direction (which is an upper direction in FIG. 12) in which the LCD frame metal sheet 170 detaches from the front case 142. FIG. 12 is a partially enlarged sectional view of the movable part 140.

A tip of the inner wall $144a_1$ of the inner member 144a of the rear case 144 is inserted into and engaged with the engagement groove 142b, as shown in FIG. 12. Thereby, the front case 142 and the rear case 144 are engaged with each other. The end 142c contacts an end $144b_1$ of an outer member 144b of the rear case 144. The screw 147 is inserted into each of a pair of perforation hole 142d.

The rear case 144 has a two-layer structure that consists of an inside part 144a and an outside part 144b, as shown in FIG. 12.

Figure 13:
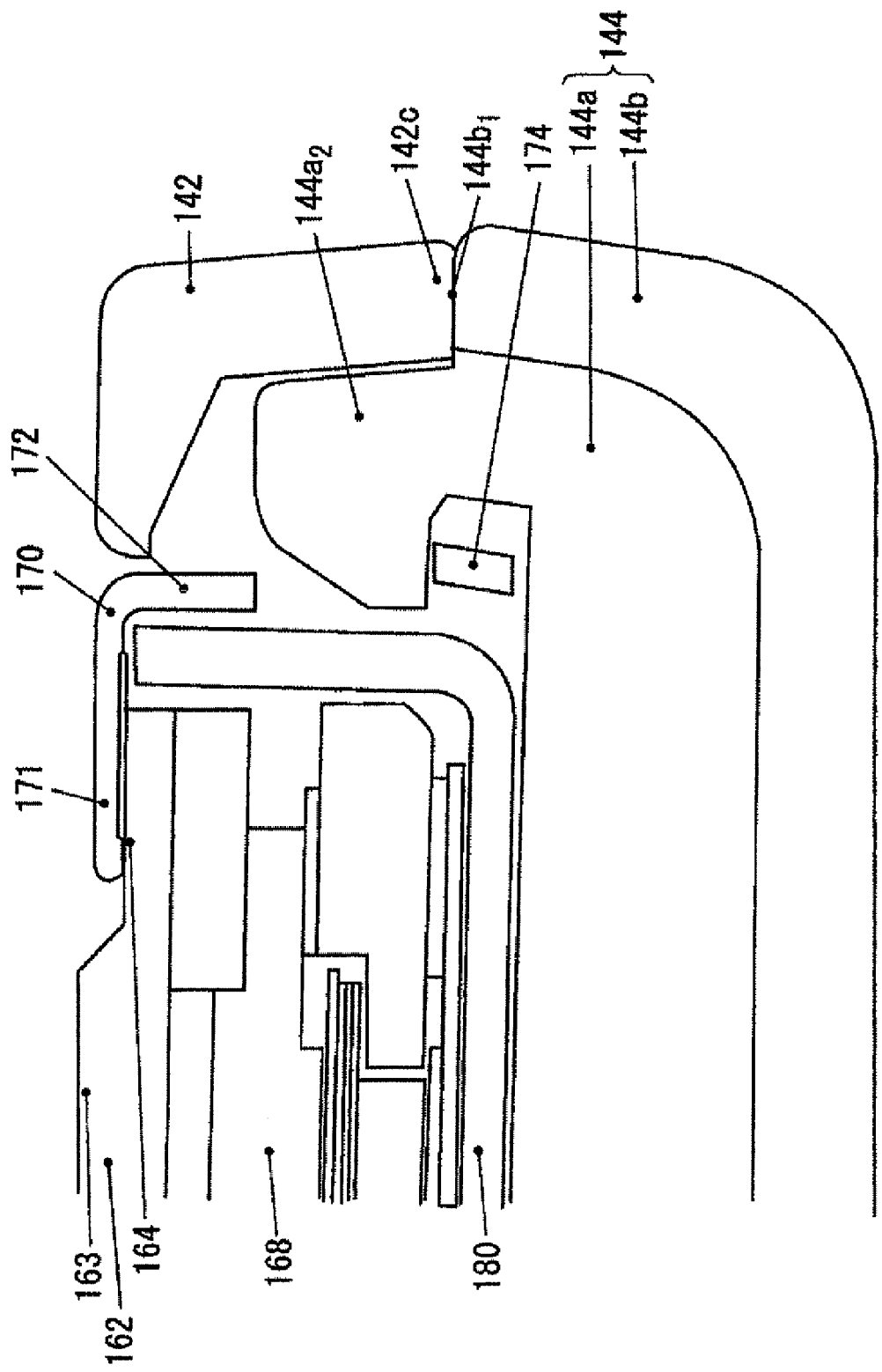
FIG. 13 is a partially enlarged sectional view of the movable part shown in FIG. 10.

The inside part 144a defines an internal surface of the rear case 144, and has the inner wall $144a_1$ shown in FIG. 12 and a hook $144a_2$ shown in FIG. 13. The inner wall $144a_1$ projects from the end $144b_1$ of the outer member 144b, and is inserted into the engagement groove 142b of the front case 142. As a result, the front case 142 is engaged with the rear case 144, and a movement of the front case 142 is restricted in a horizontal direction shown in FIG. 12. The hook 144$a_2$ is an engagement part with an engagement part 174 of an LCD frame metal sheet 170 of the LCD unit 160, which will be described later, as shown in FIG. 11 (upper right) and FIG. 13. Thereby, a movement of the hook 144$a_2$ is restricted in a direction (which is an upper direction in FIG. 12) in which the LCD frame metal sheet 170 is detached from the front case 142. The number of hooks 144$a_2$ corresponds to the number of engagement parts 174, and the arrangement of the hooks 144$a_2$ corresponds to the arrangement of the engagement parts 174 of the LCD frame metal sheet 170, which will be described later. This embodiment provides seven hooks 144$a_2$ at circled positions in FIG. 11 (left). FIG. 13 is a partially enlarged sectional view of the movable part 150.

The outside part 144$b$ defines an outer surface of the rear case 144, and contacts the end 142$c$ of the front case 142 at the end 144$b_1$.

The board 145 is a printed board arranged between the LCD unit 160 and the rear case 144, and is connected to the receiver 150 and the LCD unit 160. The board 145 is connected to the printed board of the arm 120 and the printed board of the fixing part 110. The board 145 supplies sound data to the receiver 150 and various types of information to be displayed, to the LCD unit 160.

The case pad 146 covers the screws 147, and prevents their exposures. The case pad 146 hides the screws 147, and eliminates a user's motivation to detach the screws 147 and disassemble the movable part 140.

A pair of screws 147 serve as fixing members configured to perforate a pair of perforation holes 142$d$ of the front case, and to fix the front case 142 onto the rear case 144 via the perforation holes 142$d$. This configuration prevents a detachment of the front case 142 from the rear case 144 on external impact, and a resultant detachment of the LCD unit 160 from the front case 142, improving the impact resistance.

Figure 14:
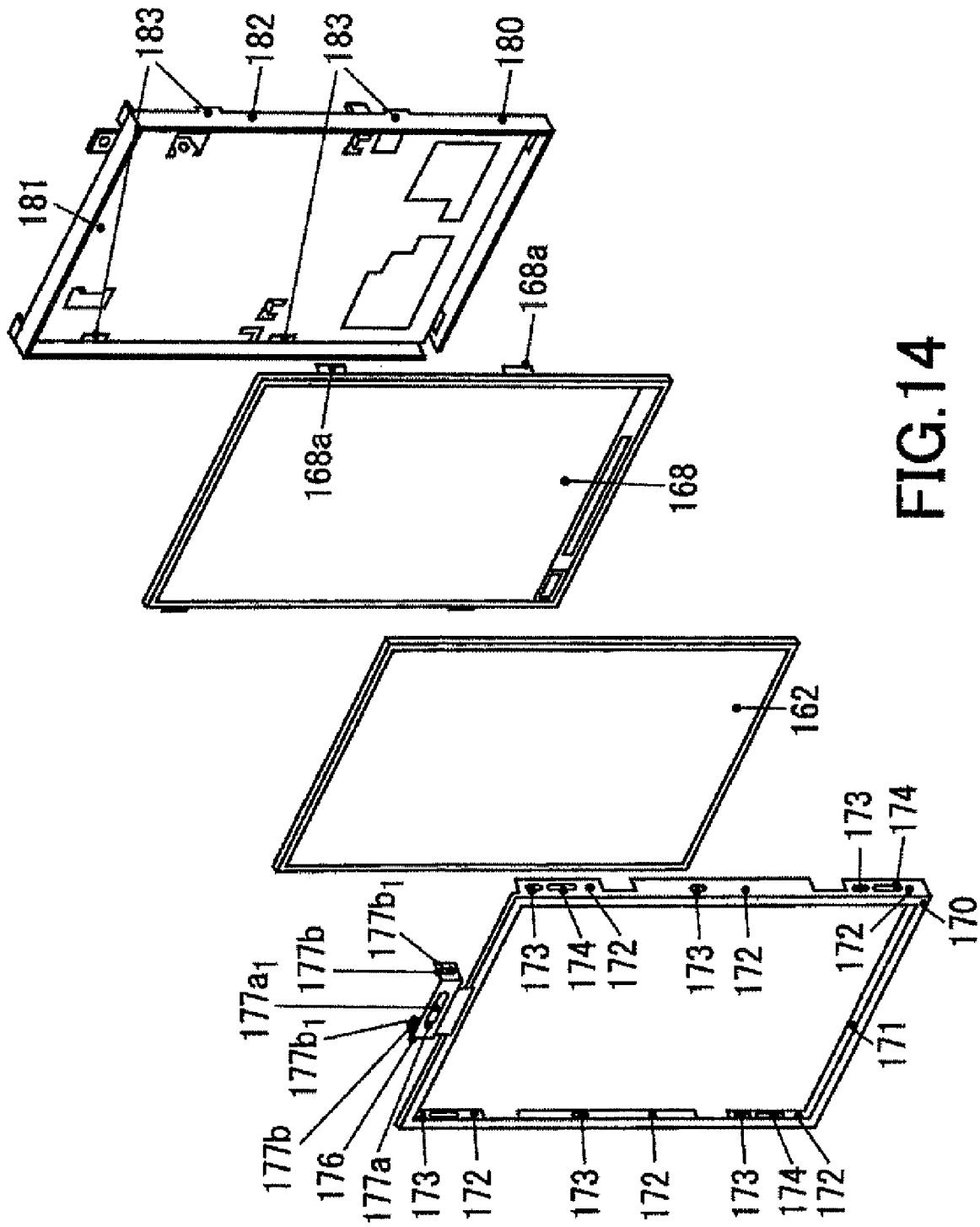
FIG. 14 is an exploded perspective view of the LCD unit of the movable part shown in FIG. 10.

FIG. 14 is an exploded perspective view of the LCD unit 160. The LCD unit 160 includes an LCD frame metal sheet 170, an LCD panel 162, a double-sided tape 166, a packing 167, an LCD module 168, and an LCD holder metal sheet 180.

The LCD frame metal sheet 170 is a metal frame, and cooperates with the LCD holder metal sheet 180 to compress the LCD panel 162 from the top, preventing floating of the LCD panel 162. In addition, the LCD frame metal sheet 170 maintains the strength of the LCD panel 162 even when the LCD panel 162 has a wide screen. The LCD frame metal sheet 170 of this embodiment is engaged with the front case 142 and the rear case 144 in order to prevent dropping of the LCD unit 160 from the housing 141. In addition, the LCD frame metal sheet 170 exposes the center part 163 of the LCD panel 162. The LCD frame metal sheet 170 has a top plate part 171, sidewalls 172, engagement parts 173, 174, and 175, and an attachment part 176.

The top plate part 171 has a hollow rectangle shape and extends, as shown in FIG. 12, in a horizontal direction parallel to a surface of the LCD panel 162. The top plate part 171 exposes the center part 163 of the LCD panel 162, and covers a periphery 164 of the LCD panel 162.

Each sidewall 172 bends down perpendicular to the top plate part 171, as shown in FIG. 12. Part of the LCD holder metal sheet 180 is located inside of the sidewalls 172.

Figure 15:
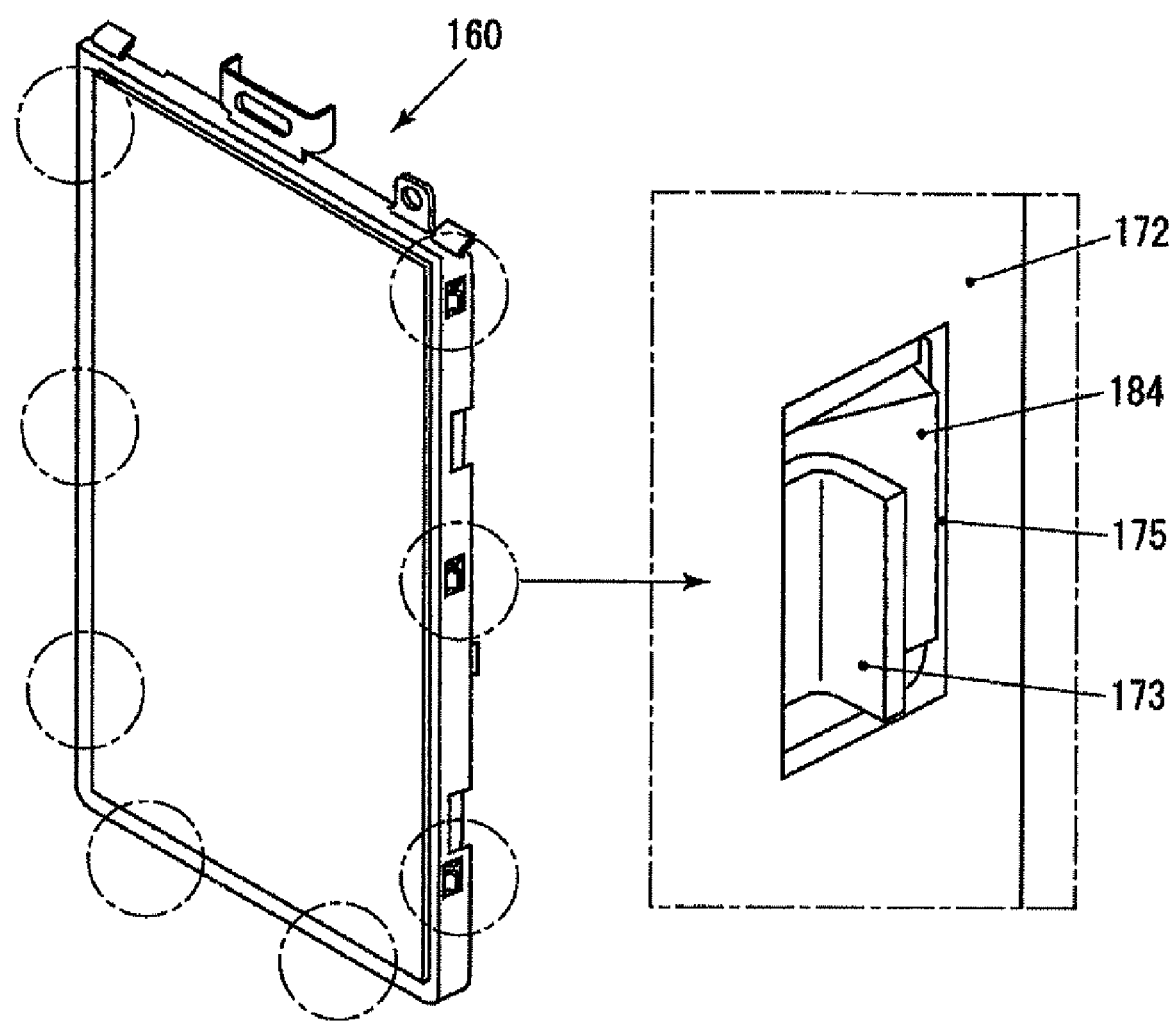
FIG. 15 (left) is a perspective view of the LCD unit of the movable part shown in FIG. 10.
Figure 16:
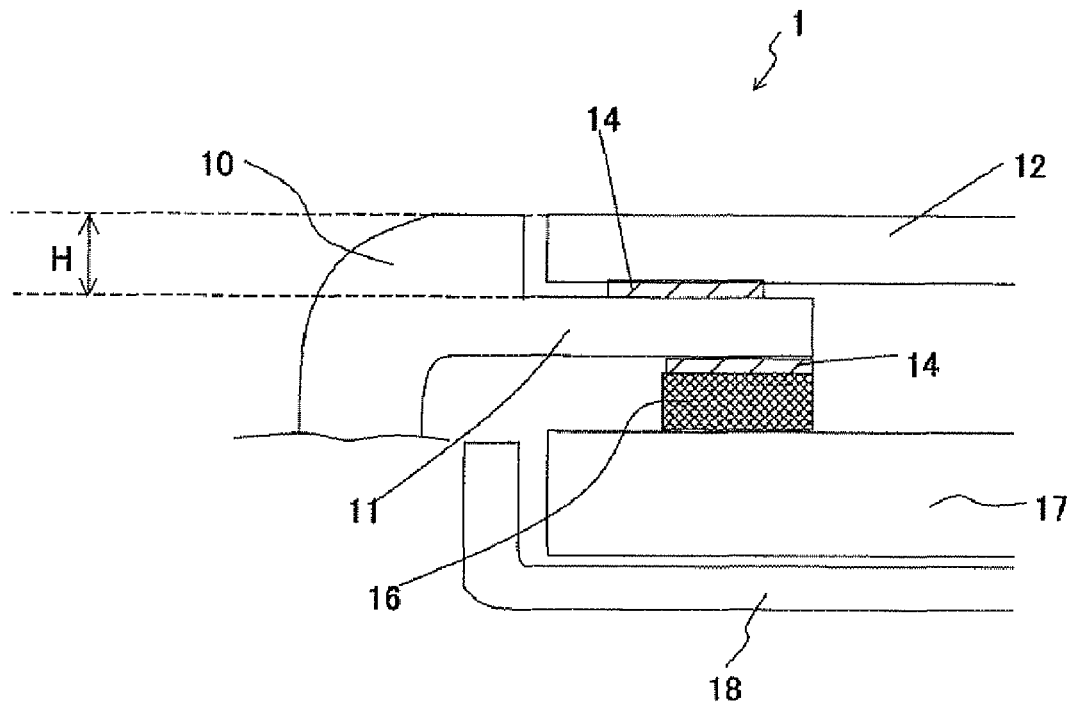
FIGS. 16A and 16B are schematic partially sectional views of conventional movable parts.
Figure 16:
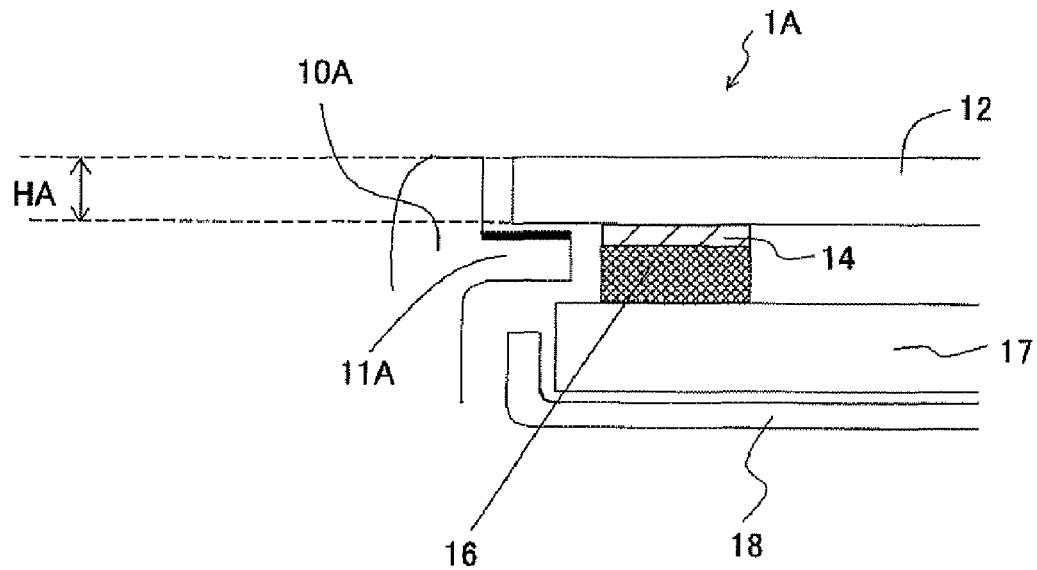

The engagement parts 173 can contact the engagement part 142$a$ of the front case 142, and the engagement part 142$a$ of the front case 142 restricts a movement of the engagement part 173 in the upper direction shown in FIG. 12 or the direction in which the LCD unit 160 is detached from the rear case 144. The engagement parts 173 are provided at eight circled positions in FIG. 15 (left). FIG. 15 (left) is a perspective view of the LCD unit 160. FIG. 15 (right) is an enlarged perspective view of the engagement parts 173. As shown in FIG. 12 and FIG. 15 (right), each engagement part 173 extends parallel to the top plate 171 or in the horizontal direction parallel to the surface of the LCD panel 162. The engagement parts 173 and 174 prevent floating of the LCD panel 162 from the housing 141 on external impact. The engagement part 173 is formed by cutting part of each sidewall 172 and bending the cut part.

The engagement parts 174 are engaged with the hook 144$a_2$ of the rear case 144, and formed by cutting part of each sidewall 172 and bending the cut part. The hook 144$a_2$ of the rear case 144 restricts a movement of the engagement part 174 in the upper direction shown in FIG. 13 or in a direction in which the LCD unit 160 is separated from the rear case 144. The engagement parts 174 are provided at seven circled positions in FIG. 11 (left). The engagement part 174 and the hook 144$a_2$ prevent floating of the LCD panel 162 over or dropping of the LCD panel 162 from the housing 141 on external impact.

The engagement part 175 contains a bottom surface of a hole that forms the engagement part 173 of the sidewall 172 as shown in FIG. 15 (right). The engagement part 175 is engaged with the engagement part 184 of the LCD holder metal sheet 180, and prevents the LCD frame metal sheet 170 from separating from the LCD holder metal sheet 180.

The attachment part 176 is part to which the receiver 150 is attached. The multifunctional LCD frame metal sheet 170 that accommodates the receiver 150 provides a miniaturization in comparison with a case where another member that accommodates the receiver 150 is separately provided. The attachment part 176 has a top plate 177$a$ and a pair of side plates 177$b$. The top plate 177$a$ has a perforation hole 177$a_1$ configured to expose the receiver 150. Each side plate 177$b$ has a perforation hole 177$b_1$, into which part of the receiver 150 is inserted for engagements.

The LCD panel 162 is located between the LCD frame metal sheet 170 and the LCD holder metal sheet 180, and serves as a display panel that displays information, such as transmission information, reception information, address book information, information input from the input part 111, and various types of function information. The LCD panel 162 has the center part 163 and the periphery 164, and the periphery 164 is depressed in comparison with the center part 163. The LCD panel 162 exposes at the center part 163 from the housing 141.

The LCD panel 162 of this embodiment is different from the conventional LCD panel 12 in that the LCD panel 162 is not supported by the front case 142. Therefore, the front case 142 does not have to possess the accommodation height H or HA, and can be configured thin. The conventional LCD panel 12 is located outside the front case 10 or 10A, and needs a thickness of about 0.6 mm to 0.8 mm so as not to get damaged on external impact. On the other hand, this embodiment maintains this strength by an engagement between the metal LCD frame 107 and the LCD holder metal sheet 180 which are made of metal, and can make the thickness of the LCD panel 162 lower than the conventional thickness down to about 0.3 mm.

This embodiment arranges the LCD frame metal sheet 170 between the front case 142 and the LCD panel 162. As shown in FIGS. 12 and 13, part of the front case 142, part of the LCD panel 162 (such as a front surface of the center part 163), and the part of the LCD frame metal sheet 170 (such as a front surface of the top plate part 171) constitute approximately the same plane. An arrangement of the same plane prevents a projection of one of these members, a contact of that member with an external member, and a resultant damage, in addition to providing a low profile. The "same plane" in this application intends to cover the plane that is not completely the same plane, and permits a slight shift (by several millimeters below the decimal) from the same plane.

One surface of the double-sided tape 166 is adhered to a periphery 165 on the rear surface of the LCD panel 162 (or a surface on the side of the LCD module 168), and the other surface of the double-sided tape 166 is adhered to a packing 167. The packing 167 is a dustproof member made of Poron (urethane sponge) or Zuren (urethane foam). The surface of the packing 167 opposite to the double-sided tape 166 contacts the LCD module 168. Thus, this embodiment provides a dustproof member between the LCD panel 162 and the LCD module 168, and improves the dust resistance of the cellular phone 100. The packing 167 is provided between the LCD panel 162 and the LCD module 168, but the packing 167 is located between the LCD frame metal sheet 170 and the LCD holder metal sheet 180, which are made of metal and strongly engaged with each other, preventing floating of the LCD panel 162 due to the reaction of the packing 167.

The LCD module 168 is a module arranged between the LCD frame metal sheet 170 and the LCD holder metal sheet 180. The LCD module 168 has four engagement parts 168a configured to engage with the LCD holder metal sheet 180. Each engagement part 168a is engaged with an engagement groove 183 in the LCD holder metal sheet 180. The LCD module 168 is a plate member that holds the LCD panel 162.

The LCD holder metal sheet 180 is a plate member that supports the LCD module 168. The LCD holder metal sheet 180 is a metal holder that is configured to engage with the LCD frame metal sheet 170. The LCD holder metal sheet 180 includes a bottom plate 181, and sidewalls 182 that are formed by bending the bottom plate 181. The bottom plate 181 has a plate shape, but has convexes and concaves so as to improve the rigidity. Four engagement grooves 183 are formed near the boundaries between the bottom plate 181 and the sidewalls 182. The engagement parts 168a of the LCD module 168 are inserted into the engagement grooves 183. In addition, plural engagement parts 184 are formed on the sidewalls 182. Each engagement part 184 is formed by cutting part of the sidewall 182 in a U shape and inclining the cut part to the outside. The engagement part 184 is configured engage with the LCD frame metal sheet 170. Eight engagement parts 184 are provided as shown in FIG. 15 (left) corresponding to the engagement parts 175 of the LCD frame metal sheet 170. FIG. 12 and FIG. 15 (right) show the engagement state between the engagement part 184 and the engagement part 175.

The cellular phone 100 of this embodiment engages the metal LCD frame metal sheet 170 with the LCD holder metal sheet 180, and holds and fixes the LCD panel 162 between them. This configuration prevents floating of the LCD panel 162. The LCD frame metal sheet 170 and the LCD holder metal sheet 180 are made of metal and stronger than resin, and can be made thinner than the minimum thickness formable through resin molding, providing a low profile. Moreover, the front case 142 does not need the accommodation height H or HA, providing a low profile.

In operation, at the use time, the user unfolds the arm 120 from the fixing part 110 by utilizing the hinge part 130, and rotates the movable part 140 relative to the arm 120 when the user would like to view the LCD unit 160 in a lateral orientation. In this case, a bending stress applies, but a strong engagement between the LCD frame metal sheet 170 and the LCD holder metal sheet 180 that are made of metal bears the bending stress. In addition, the user can view a wide screen of the LCD panel 162 whose strength is maintained. When the user does not use the cellular phone 100, he folds it as shown in FIG. 5. The front case 142 does not need to secure the accommodation height H or HA, and the cellular phone 100 becomes thin, providing a superior portability. Moreover, the strong engagement between the LCD frame metal sheet 170 and the LCD holder metal sheet 180 that are made of metal can prevent floating of the LCD panel 162 due to the reaction of the packing 167.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, this embodiment uses a LCD for the display, but the present invention may use an organic electro-luminescence ("OEL").

This application claims the benefit of Japanese Patent Application No. 2007-249323, filed Sep. 26, 2007, which is hereby incorporated by reference herein in its entirety.

What is claimed is:

1. An electronic apparatus comprising:
   a frame made of metal, the frame having a top plate part and an engagement part different from the top plate part;
   a holder that is engaged with the frame;
   a display panel that is arranged between the frame and the holder, and a periphery of the display panel is covered by the top plate part of the frame and
   a housing that includes a front case and a rear case, and accommodates the frame, the holder and the display panel in such a manner that a top surface of the front case, a top surface of the top plate part of the frame, and a top surface of the display panel constitute the same plane.

2. The electronic apparatus according to claim 1, wherein the front case includes an engagement part that is configured to contact part of the frame, and to restrict a movement of the frame in a direction in which the frame detaches from the front case.

3. The electronic apparatus according to claim 1, wherein the rear case includes an engagement part that is configured to contact part of the frame, and restricts a movement of the frame in a direction in which the frame detaches from the front case.

4. The electronic apparatus according to claim 1, wherein the frame exposes a center part of the display panel and covers a periphery of the display panel, and the display panel is depressed at the periphery.

5. The electronic apparatus according to claim 1, further comprising:
   a module arranged between the display panel and the holder, engaged with the holder, and configured to hold the display panel; and
   a dustproof member arranged between the display panel and the module.

6. The electronic apparatus according to claim 1, wherein the front case has a perforation hole, and
   wherein the electronic apparatus further includes a fixture member configured to fix the front case onto the rear case via a perforation hole in the front case.

7. The electronic apparatus according to claim 1, further comprising a receiver, wherein the frame includes an attachment part to which the receiver is attached.

* * * * *

UNITED STATES PATENT AND TRADEMARK OFFICE
CERTIFICATE OF CORRECTION

| | | |
|---|---|---|
| PATENT NO. | : 7,847,878 B2 | Page 1 of 1 |
| APPLICATION NO. | : 12/183130 | |
| DATED | : December 7, 2010 | |
| INVENTOR(S) | : Hiroshi Kobayashi et al. | |

It is certified that error appears in the above-identified patent and that said Letters Patent is hereby corrected as shown below:

Column 8, line 30, delete "frame and", and insert -- frame; and --, therefor.

Signed and Sealed this

Nineteenth Day of April, 2011

David J. Kappos
*Director of the United States Patent and Trademark Office*